US006616457B2

United States Patent
Derraugh et al.

(10) Patent No.: US 6,616,457 B2
(45) Date of Patent: Sep. 9, 2003

(54) BOOK COVER FOR RETAINING OBJECTS AND BOOK INCORPORATING IT THEREIN

(76) Inventors: William Derraugh, 35 Rogues Ridge Rd., Weston, CT (US) 06883; Michael Morris, 78 Spoonwood Rd., Wilton, CT (US) 06897

(*) Notice: Subject to any disclaimer, the term of this patent is extended or adjusted under 35 U.S.C. 154(b) by 0 days.

(21) Appl. No.: 09/782,675

(22) Filed: Feb. 13, 2001

(65) Prior Publication Data

US 2002/0110794 A1 Aug. 15, 2002

(51) Int. Cl.[7] .............................................. G09B 19/22
(52) U.S. Cl. .......................... 434/259; 434/407; 281/31
(58) Field of Search .............................. 281/29, 31, 37, 281/51; 434/259, 258, 407; 446/147, 151, 152

(56) References Cited

U.S. PATENT DOCUMENTS

| 4,176,473 | A | * | 12/1979 | Rae ........................ 281/15.1 X |
| 5,441,262 | A | * | 8/1995 | Figone et al. ................ 273/157 |
| 5,667,064 | A | * | 9/1997 | Bauman ...................... 206/214 |
| 5,704,646 | A | * | 1/1998 | Tzeng .......................... 281/29 |
| 5,857,706 | A | * | 1/1999 | McQueeny .................. 281/29 |
| 5,915,729 | A | * | 6/1999 | Vap .............................. 281/22 |
| 6,086,105 | A | * | 7/2000 | Woldenberg et al. ......... 281/31 |
| 6,086,106 | A | * | 7/2000 | Joe et al. ...................... 281/31 |

* cited by examiner

Primary Examiner—Kien T. Nguyen
(74) Attorney, Agent, or Firm—Tope McKay & Associates

(57) ABSTRACT

A book cover for retaining objects is presented including a front panel and back panel hingedly connected to form a book cover. A window extends outward from the front panel in the book cover, forming an enclosure for retaining objects between the cover and a surface proximate to the cover. The window can be clear, displaying the objects held in place thereby, and the book cover may include a closure mechanism to prevent the window from opening and letting the pieces out. The book cover may also be incorporated into an educational activity book comprising a front panel and a back panel connected to form a book cover. Puzzle pieces may be provided in one embodiment for inclusion in the cover of the book in order to assist in teaching children object association and enhancing their coordination.

4 Claims, 3 Drawing Sheets

BOOK COVER FOR RETAINING OBJECTS AND BOOK INCORPORATING IT THEREIN

TECHNICAL FIELD

The present invention relates to the field of amusement devices and more specifically to children's puzzles which function as both toys and educational teaching aids.

BACKGROUND

Children's books function as both toys and educational teaching aids. The use of puzzles as toys and teaching aids is well known. Some children's books in the past have had magnetic pieces or stickers that can be applied to the pages to complete a missing part of either a pictorial or verbal story. The process of supplying a missing part to such a puzzle-like device is educational for the preschool aged child and also assists in developing hand-eye coordination.

Because of the multitude of small pieces generally associated with children's puzzles, pieces are often lost. Furthermore, because there is no way of retaining the pieces in a puzzle board, transportation of children's puzzles is problematic because puzzle pieces are easily dislodged from the board and lost. Therefore, it would be desirable to have a puzzle book that is self-contained and easy to transport with a transparent window built into the front cover that would allow both parent and child to see the puzzle pieces contained within the book. Additionally, the puzzle pieces are sometimes difficult for pre-school aged children to handle and remove because of the lack of means for easily grasping the puzzle piece. Therefore a puzzle book of this type would have some type of handle on the puzzle pieces that could be easily grasped by a young child.

Also, in addition to puzzle-type books, other types of books frequently have objects accompanying them. These items also frequently become displaced or are not obvious to the purchaser. A method for retaining these objects within the front cover, and yet displaying them with the front cover closed would also be beneficial.

SUMMARY OF THE INVENTION

It is an object of the present invention to provide a book cover designed to retain objects and to display them to a consumer. A window extending outward from the cover would provide such a space for storage and display.

It is another object of the present invention to provide an easily transportable educational puzzle book. The puzzle book has one or more pages and the windowed cover. There are recessed cut outs in some of the pages within which the puzzle pieces would fit. The invention includes a front cover with a window that retains the puzzle pieces, which are placed within deep recesses on the first inner panel that immediately follows the front cover. This allows the front cover to be closed and the book to be transported with little risk of loss of the puzzle pieces.

It is another object of the present invention to provide an easy method for a preschool child to grasp and manipulate the puzzle pieces. Each puzzle piece may be equipped with a centrally protruding handle. The handle would allow a child to lift the puzzle pieces from their placements within a page recess.

It is another object of the present invention to allow a child, parent, or other consumer to see the puzzle pieces contained between the front cover and first page. The front cover is equipped with a window. In at least one embodiment of the present invention this window is transparent. This allows the puzzle pieces to be seen and also provides an interesting visual incentive for a preschool child to play with the book. A parent may easily see if all the puzzle pieces are present and accounted for.

It is another object of the present invention to be educational. The puzzle pieces in at least one embodiment have illustrations that match missing parts of certain illustrations on the inner panels of the puzzle book. For example, the puzzle pieces may illustrate methods of transportation. The matching recess on the inner panel would require completion with a means appropriate to transportation by ground, sea, or air. Some of the puzzle pieces may fit into and match more than one of the inner pages.

BRIEF DESCRIPTION OF THE DRAWINGS

FIG. 1b provides a schematic representation of the front view of the embodiment of the present invention shown in FIG. 1a;

FIG. 1c provides a schematic representation of the back view of the embodiment of the present invention shown in FIG. 1a;

DETAILED DESCRIPTION

The present invention relates to a book cover incorporating a window to retain items associated with a book. The book cover may be utilized for a variety of applications including use with children's puzzle books. The following description is presented to enable one of ordinary skill in the art to make and use the invention and to incorporate it in the context of particular applications. Various modifications, as well as a variety of uses in different applications will be readily apparent to those skilled in the art. The general principles defined herein may be applied to a wide range of embodiments. Thus the present invention is not intended to be limited to the embodiments presented, but is to be accorded the widest scope consistent with the principles and novel features disclosed herein.

Figure 1A:
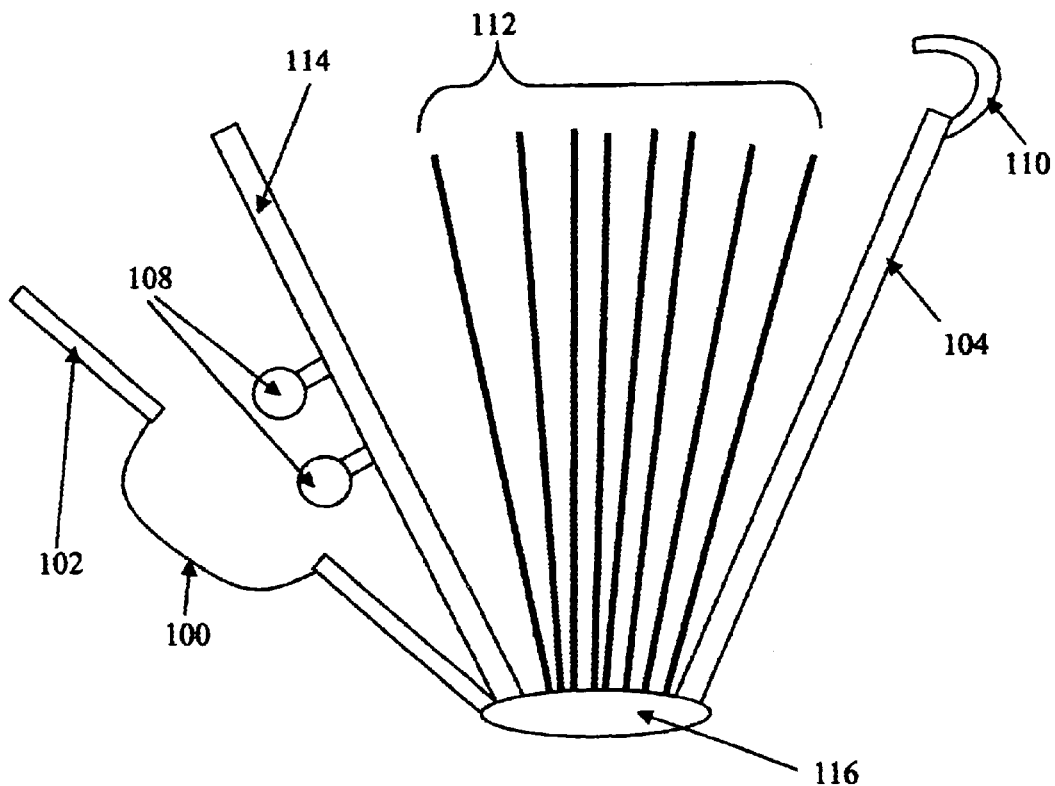
FIG. 1a provides schematic representation of a top view of one embodiment of the present invention applied for retaining objects along with retained puzzle pieces with handles.
Figure 1:
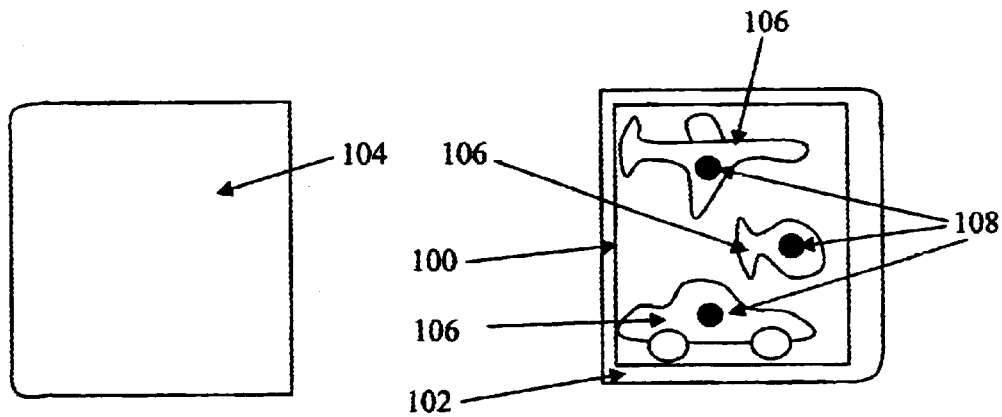

An embodiment of the book cover for retaining objects of the present invention is shown in FIG. 1, incorporated into a puzzle book for preschool-aged children. In this embodiment, a window 100 is part of a front panel 102, which is hingedly connected with a back panel 104 to form a book cover. The window 100 may comprise a clear plastic material to allow the puzzle pieces 106 to be seen with the front panel 102 closed. The puzzle pieces 106 are formed with different shapes that are designed to fit into recesses 106. Each of the puzzle pieces 106 is fitted with a handle 108 in this embodiment of the invention. The window 100 allows the front panel 102 to close and forms an enclosure for retaining the puzzle pieces 106 or other objects such as, for example, small toys. If there are handles 108 extending out from the puzzle pieces 106, the outwardly protruding window 100 can be designed, as shown, to provide clearance from the handles 108, thus permitting the front panel 102 to close securely. Furthermore, a closure 110 can be incorporated in the cover to provide a more secure means for closing the window. Non-limiting examples of closures include Velcro, buttons, and snaps. In one embodiment, behind the front panel 102 there are inner panels 112, with the first inner panel 114 being the one most proximate to the front panel 102. A binding 116 hingedly connects the front panel 102 with the back panel 104 and with any inner panels 112, 114 that may be present.

Figure 2:
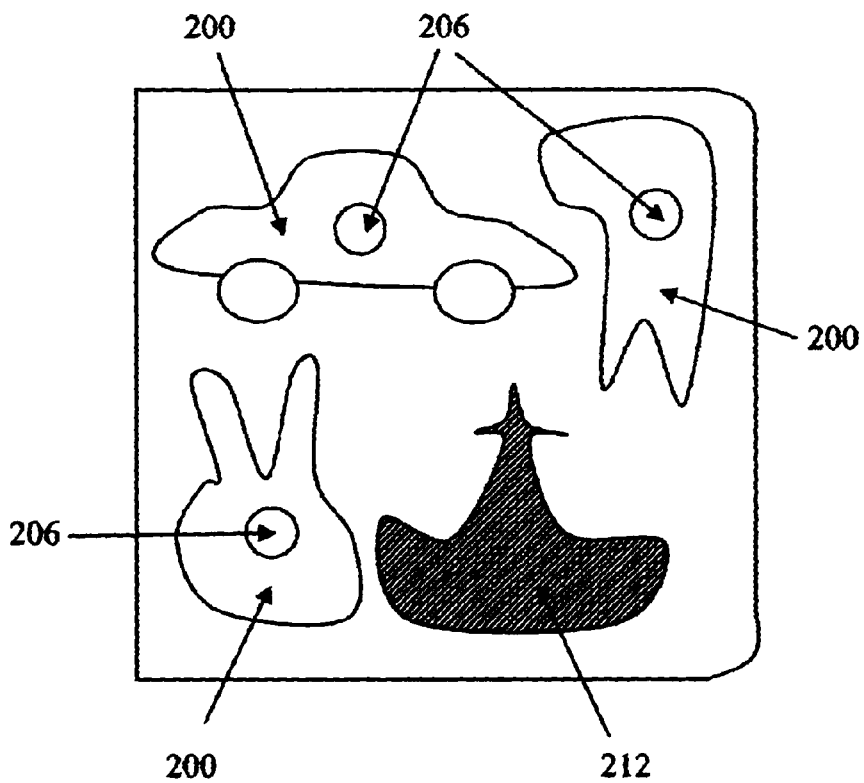
FIG. 2a provides a diagram of a front view of an embodiment of the present invention, wherein the first inner panel includes deep recesses and retains puzzle pieces with handles.
FIG. 2b provides a diagram of a side view of an embodiment of the present invention, wherein the first inner panel includes deep recesses and retains puzzle pieces with handles.
Figure 2:
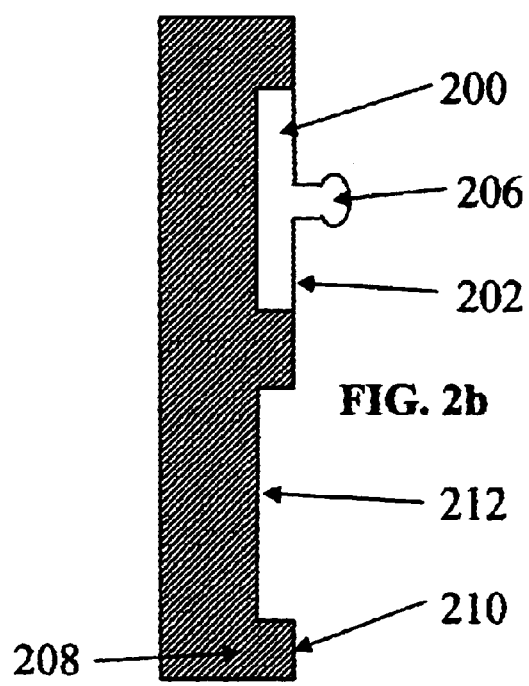

Handles on the puzzle pieces are shown in FIG. 2. Each puzzle piece 200 has a front side 202 and a back side 204. In this particular embodiment of the present invention, the puzzle pieces 200 are shown with handles 206 that extend out perpendicular to the front side 202 of a puzzle piece 200. The handles 206 take various forms, non-limiting examples of which include pegs and rings. The handles 206 are preferably made of a rigid material such as plastic or wood. In this particular embodiment the first inner panel 208 is thicker than the subsequent inner panels 112. This allows the puzzle pieces 200 to sit flush with the front surface 210 of the first inner panel 208 when placed into recessed shapes 212 in the first inner panel 208.

Figure 3:
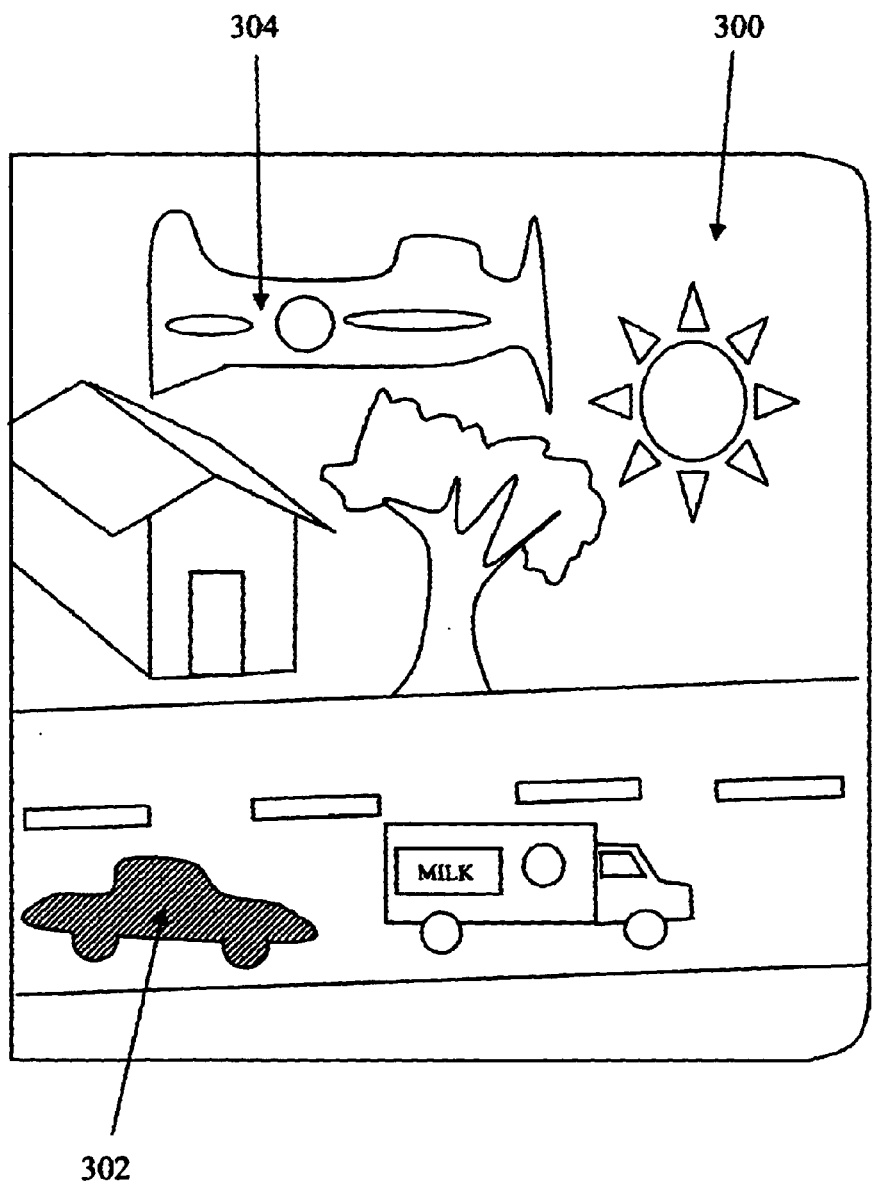
FIG. 3a provides a schematic diagram of an embodiment of the present invention showing subsequent inner panels opened such that the book lays flat.
FIG. 3b provides a side view of an embodiment of the present invention showing subsequent inner panels and illustrating one of the recesses.
Figure 3:
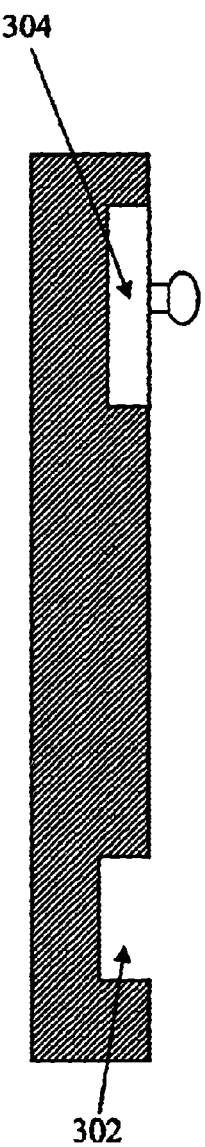

An example of one possible inner panel is shown in FIG. 3. In this particular embodiment there are illustrations of various scenes on the inner panels 300. The inner panels have recesses 302 cut into them. In this example, a puzzle piece 304 is shaped as an airplane. Although an airplane is used to demonstrate the shape of a puzzle piece, other shapes may be used. Non-limiting examples of such shapes include an automobile or a boat. In this case, a puzzle piece 304 could fit into a recess 302 that is located in the area of an illustration on an inner panel that shows the sky to illustrate a plane flying. As a further example, another puzzle piece 304 shaped and illustrated to represent an automobile would fit into a recess 302 located in the area of the illustration that shows the ground. Each puzzle piece 304 may fit into a scene on more than one of the inner panels 300. Pattern association of puzzle pieces to the inner panel illustrations can help to teach children while helping them develop hand-eye coordination.

What is claimed is:

1. An educational activity book comprising: a front panel and a back panel, the front panel hingedly connected with the back panel to form a book cover with an inside and an outside; at least one puzzle piece with a unique shape, and a front side and a back side; and a window extending outward from the front panel in said book cover thereby forming an enclosure for retaining objects between said book cover and a surface proximate to said front panel, and further comprising at least one inner panel hingedly connected by a binding to the inside of said book cover, said inner panel having at least one recession formed therein, with the recession having a shape matching the shape of at least one of said puzzle pieces.

2. An educational activity book as set forth in claim 1, further comprising an illustration on the front side of said puzzle piece and a handle perpendicularly attached to and protruding from the front side of said puzzle piece to facilitate the grasping of said puzzle piece.

3. An educational activity book as set forth in claims 1, wherein the at least one inner panel has a recession equal to the thickness of said puzzle piece.

4. An educational activity book as set forth in claim 1, further comprising an illustration on at least one inner panel, and at least one puzzle piece with a complementary illustration placed thereupon.

* * * * *